United States Patent [19]

Sugano

[11] Patent Number: 4,585,102
[45] Date of Patent: Apr. 29, 1986

[54] HYDRAULIC CONTROL SYSTEM FOR AUTOMATIC TRANSMISSION HAVING TORQUE CONVERTER WITH LOCK-UP MECHANISM

[75] Inventor: Kazuhiko Sugano, Zama, Japan

[73] Assignee: Nissan Motor Co., Ltd., Yokohama, Japan

[21] Appl. No.: 538,427

[22] Filed: Oct. 3, 1983

[51] Int. Cl.$^4$ ............................................. F16D 33/00
[52] U.S. Cl. .................................... 192/3.31; 192/3.29
[58] Field of Search ..................... 192/3.29, 3.3, 3.31, 192/0.052, 0.092, 103 F

[56] References Cited

U.S. PATENT DOCUMENTS

| | | | |
|---|---|---|---|
| 3,857,302 | 12/1974 | Morris | 192/3.3 |
| 4,095,486 | 6/1978 | Ohnuma | 74/645 |
| 4,270,636 | 6/1981 | Sunohara et al. | 192/3.31 |
| 4,294,140 | 10/1981 | Iwanaga et al. | 192/3.29 |
| 4,305,487 | 12/1981 | Sunohara | 192/3.28 |
| 4,428,259 | 1/1984 | Kubo et al. | 192/3.31 |

FOREIGN PATENT DOCUMENTS 51-11730  4/1976  Japan .
55-38539  10/1980  Japan .
1270890  4/1972  United Kingdom .

*Primary Examiner*—Rodney H. Bonck
*Assistant Examiner*—Alan G. Towner
*Attorney, Agent, or Firm*—Schwartz, Jeffery, Schwaab, Mack, Blumenthal & Evans

[57] ABSTRACT

A hydraulic control system comprises a lock-up valve including a spool movable between a clutch engagement position and a clutch release position, and a spring biasing the spool toward the clutch release position. The spool has a pressure acting area which is exposed to a first fluid pressure which is present during operation in each of a m th speed ratio and a m+1 th speed ratio. Means is provided which is responsive to a second fluid pressure which is present during operation in one of the m th speed ratio and the m+1 th speed ratio and absent during operation in the other speed ratio. The means is operative to apply the second fluid pressure to the pressure acting area of the spool of the lock-up valve instead of the first fluid pressure.

6 Claims, 6 Drawing Figures

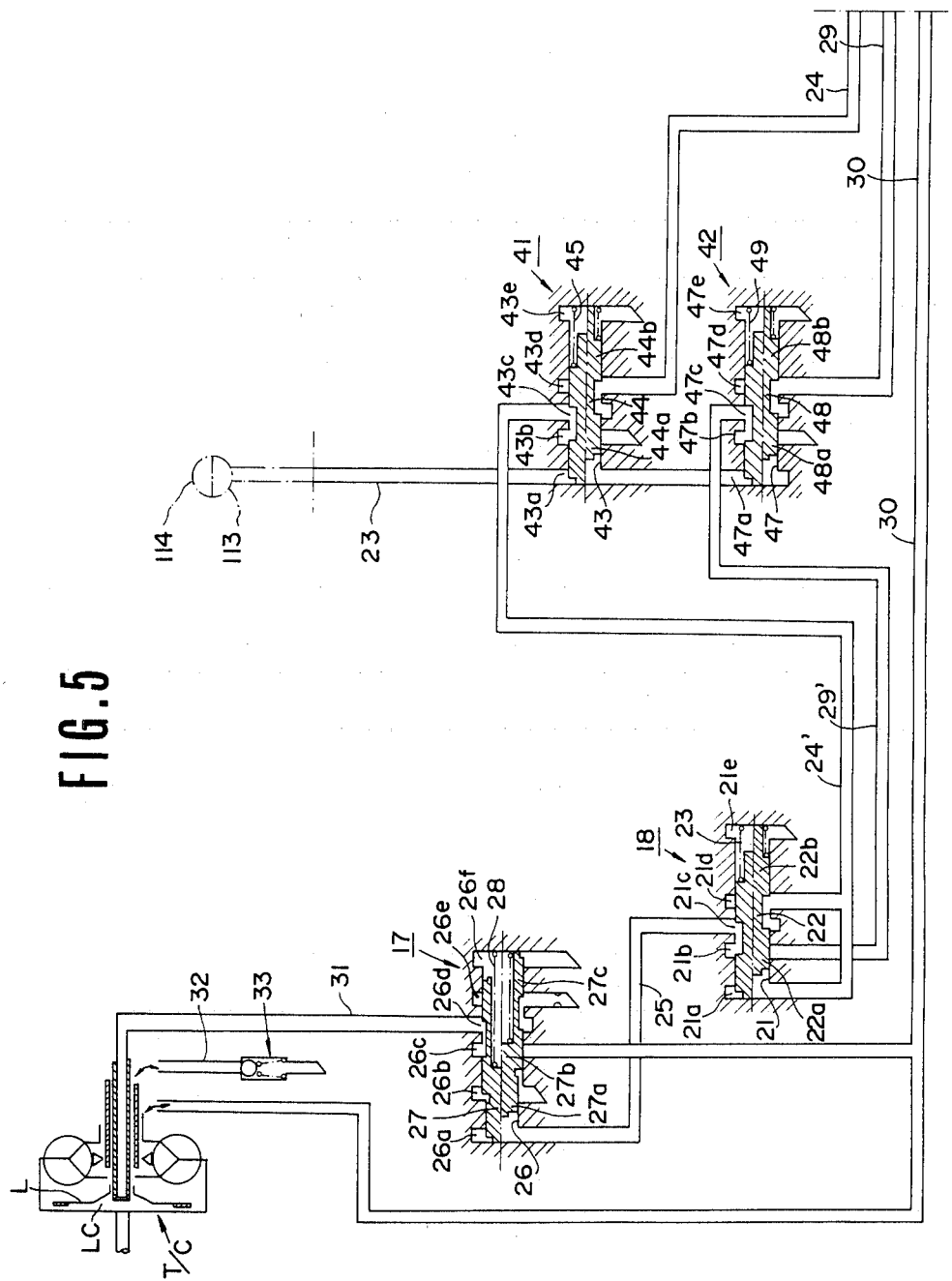

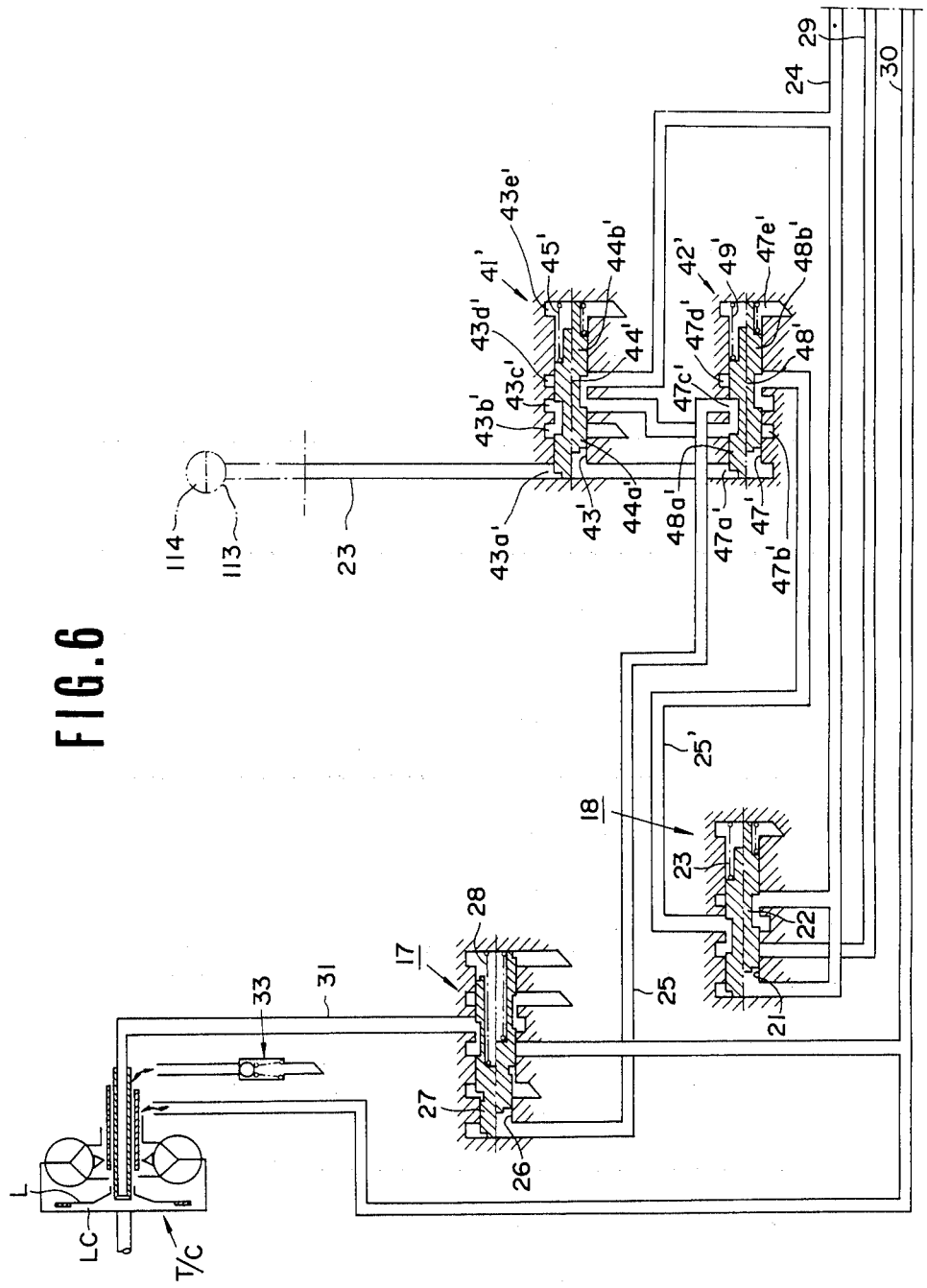

HYDRAULIC CONTROL SYSTEM FOR AUTOMATIC TRANSMISSION HAVING TORQUE CONVERTER WITH LOCK-UP MECHANISM

CROSS-REFERENCES TO RELATED APPLICATIONS

References are made to the following related copending applications, each filed in the name of kazuhiko Sugano: (1) U.S. patent application Ser. No. 494,647 filed on May 16, 1983; (2) U.S. patent application Ser. No. 507,228 filed on June 23, 1983. Reference is also made to the following related copending applications, each filed in the name of Kazuhiko Sugano concurrently with the present application; (3) U.S. patent application Ser. No. 538,278; (4) U.S. patent application Ser. No. 538,276.

BACKGROUND OF THE INVENTION

The present invention relates to a hydraulic control system for an automatic transmission having a torque converter with a lock-up mechanism.

In the case of automatic transmissions having a torque converter with a lock-up mechanism, i.e., a mechanism to directly connect a pump impeller to a turbine runner, it is preferrable to actuate the lock-up mechanism from a speed ratio as low as possible. Thus, in the case of an automatic transmission having three forward speed ratios and one reverse speed ratio, it is preferable to keep the lock-up mechanism actuated during operation in each of second and third forward speed ratios. However, if the transmission is shifted between the second and third speed ratios with the lock-up mechanism left actuated, substantial shocks will take place during shifting because torque variation takes place in the circumstance where an input shaft of the transmission is mechanically connected to a crankshaft of an engine. To avoid the shocks, an electronic control system has been needed which senses the commencement and completion of a shifting and generates electric signals for controlling the actuation of the lock-up mechanism. The electronic control system, however, requires a plurality of sensors and actuators, thus resulting in an enormous cost increase. If the same is to be carried out hydraulically, an extremely complicated hydraulic control system is necessary, thus failing to meet the demands for less cost and space saving.

SUMMARY OF THE INVENTION

According to the present invention, a hydraulic control system comprises a lock-up valve including a spool movable between a clutch engagement position and a clutch release position, and a spring biasing the spool toward the clutch release position. The spool has a pressure acting area which is exposed to a first fluid pressure which is present during operation in each of a m th speed ratio and a m+1 th speed ratio. Means is provided which is responsive to a second fluid pressure which is present during operation in one of the m th speed ratio and the m+1 th speed ratio and absent during operation in the other speed ratio. The means is operative to apply the second fluid pressure to the pressure acting area of the spool of the lock-up valve instead of the first fluid pressure.

An object of the present invention is therefore to provide a simple hydraulic control system for engaging a lock-up clutch over a plurality of speed ratios and temporarily releasing the engagement at the lock-up clutch during shifting between the speed ratios.

BRIEF DESCRIPTION OF THE DRAWINGS

FIG. 5 is a similar view to FIG. 3 illustrating a second embodiment according to the present invention; and FIG. 6 is a similar view to FIG. 3 illustrating a third embodiment.

DETAILED DESCRIPTION OF THE INVENTION

Referring to FIGS. 1 to 4, the preferred embodiment according to the present invention is described.

Figure 1:
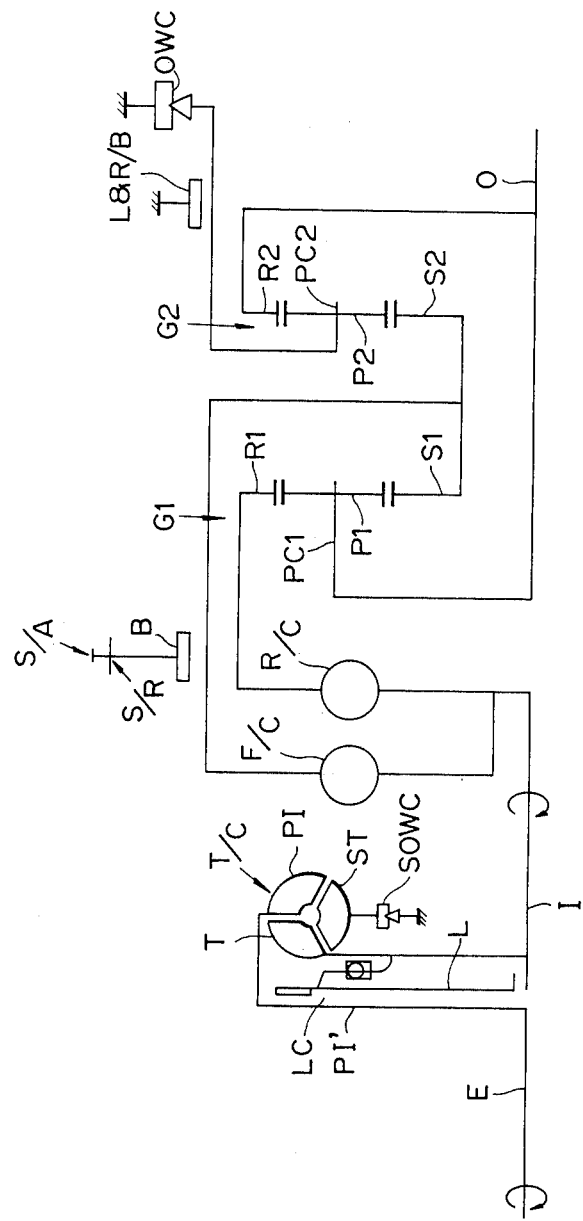
FIG. 1 is a schematic view of a power transmission mechanism of a three-speed automatic transmission.

Referring to FIG. 1, there is shown a schematic view of a power transmission mechanism of a three-speed automatic transmission having three forward speed ratios and one reverse speed ratio. This power transmission comprises an input shaft I to which rotary power is delivered from an engine output shaft E via a torque converter T/C, an output shaft O which transmits driving power to a final drive, a first planetary gear set G1, a second planetary gear set G2, a front clutch F/C, a rear clutch R/C, a band brake B, a low and reverse brake L&R/B, and one-way clutch OWC. The first planetary gear set G1 comprises an internal gear R1, a sun gear S1, and a carrier PC1 carrying pinion gears P1 meshing with the sun gear S1 and internal gear R1 simultaneously. The second planetary gear set G2 comprises an internal gear R2, a sun gear S2, and a carrier PC2 carrying pinion gears P2. The carrier PC1 is connected to an output shaft O, while the sun gear S1 is connectable with an input shaft I via the front clutch F/C, and the internal gear R1 is connectable to the input shaft I via the rear clutch R/C. The internal gear R2 is connected to the output shaft O, and the sun gear S2 is connected to the sun gear S1. The carrier PC2 is prevented from rotating in its reverse direction by the one-way clutch OWC. A low and reverse brake L&R/B is arranged to anchor the carrier PC2. The band brake B is arranged to anchor the sun gears S1 and S2. This band brake B is actuated by a servo having a servo-apply chamber S/A and a servo-release chamber S/R. When the fluid pressure is applied to the servo-apply chamber S/A, the band brake B is applied, while when the fluid pressure is applied to the servo-release chamber S/R, the band brake B is released irrespective of the presence of the fluid pressure in the servo apply chamber S/A. The torque converter T/C includes a pump impeller PI, a turbine runner T, a stator ST and a lock-up clutch L. The pump impeller PI is connected via a torque converter cover PI' to the engine output shaft E. The turbine runner T is connected to the input shaft I, and the stator ST is connected via a one-way clutch SWOC to a stationary portion of the transmission. The lock-up clutch L connected to the turbine runner T is axially movable and defines a lock-up clutch fluid pressure chamber LC in cooperation with the torque converter cover PI'. The lock-up clutch L is pressed against the torque converter cover PI' when fluid pressure in the lock-up clutch fluid pressure chamber LC is lower than that within the torque converter T/C and rotates integrally with the torque converter cover PI'. The detail construction of the lock-up clutch L is described in U.S. Pat. No. 4,305,487 issued Dec. 15, 1981 to Sunohara.

The front clutch F/C, rear clutch R/C, band brake B and low and reverse brake L&R/B (one-way clutch OWC) are engageable in the predetermined combinations shown by the following Table to provide three forward speed ratios and one reverse speed ratio.

TABLE

|  | F/C | R/C | L & R/B (OWC) | B S/R | B S/R |
|---|---|---|---|---|---|
| First speed |  | o | o |  |  |
| Second speed |  | o |  |  | o |
| Third speed | o | o |  | o | o |
| Reverse | o |  | o |  | o |

In the Table, the sign "o" indicates for each of clutches and brakes, the clutch or brake in question is engaged or applied. What is denoted by a label (OWC) below the brake B1 means that the first speed ratio is established by the one-way clutch OWC even if the brake B1 is not applied. However, in this first speed ratio, it is not possible for the output shaft O to drive the engine (that is, no engine braking is provided). What is indicated by the sign "o" in the column below B means that the servo apply chamber S/A and/or servo release chamber S/R in question are supplied with fluid pressure.

Figure 2:
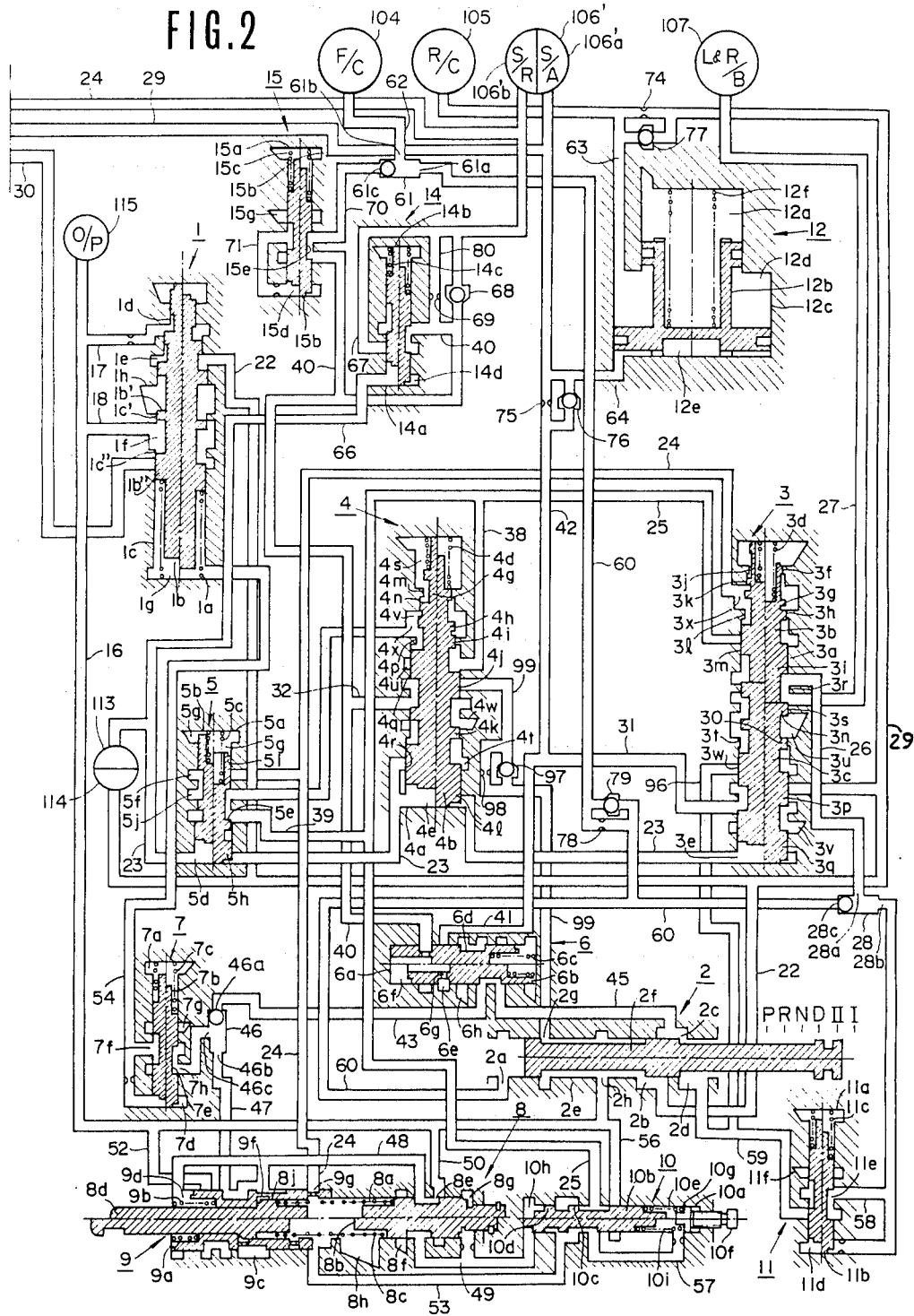
FIGS. 2 and 3, when combined, illustrate a circuit diagram of a hydraulic control system according to the present invention.
Figure 3:
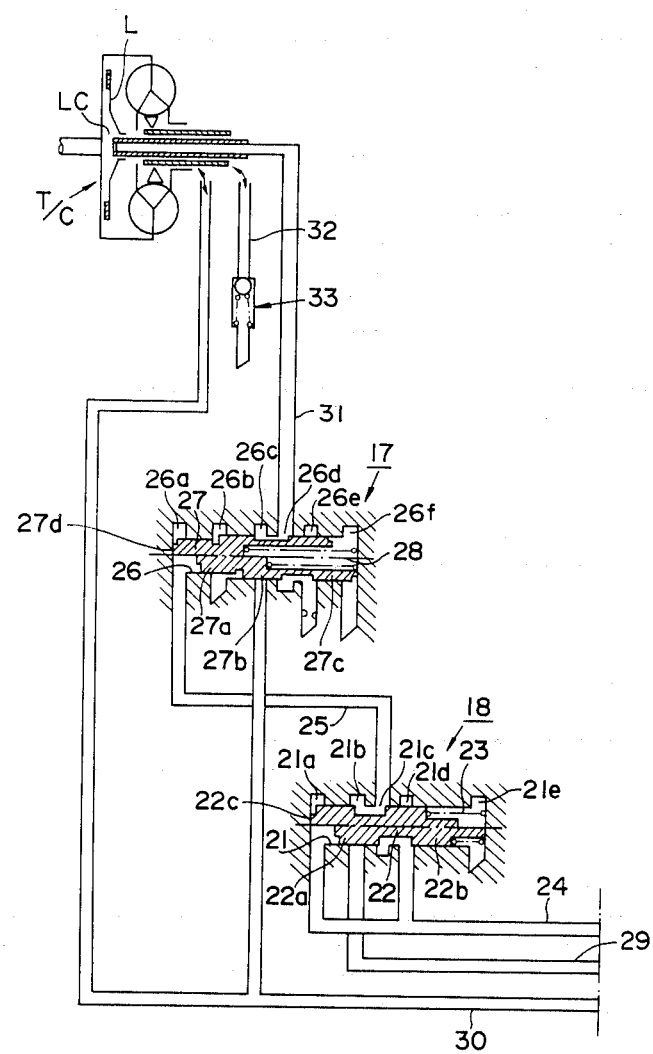

Referring to FIGS. 2 and 3, the hydraulic control system comprises a regulator valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle fail-safe valve 9, a throttle modulator valve 10, a first manual range pressure reducing valve 11, an accumulator 12, a 3-2 timing valve 14, a front clutch pressure reducing valve 15, governor valves 113, 114, a lock-up valve 17, a lock-up timing valve 18. As illustrated, these valves are connected with the torque converter T/C, lock-up clutch fluid chamber LC, front clutch F/C, rear clutch R/C, servo apply chamber S/A of the band brake B, servo release chamber S/R of the band brake B, low and reverse brake L&R/B, and oil pump O/P. The hydraulic control system is substantially the same as that of co-pending U.S. patent application Ser. No. 351,746 filed Feb. 24, 1982 by Kazuhiko SUGANO et al. (see FIG. 2) and commonly assigned herewith. The hydraulic control system according to the present invention is different from that described in U.S. patent application Ser. No. 351,746 in the provision of the lock-up valve 17 and lock-up timing valve 18 for controlling the lock-up clutch L. More particularly, the lock-up valve 17 and lock-up timing valve 18 are connected with a fluid conduit 29 which is pressurized when the hydraulic control system shown in FIG. 2 is conditioned for each of the second speed ratio and the third speed ratio and with another fluid conduit 24 which is pressurized when the hydraulic control system shown in FIG. 2 is conditioned for the third speed ratio.

The lock-up timing valve 18 comprises a spool 22 axially slidable in a valve bore 21, and a spring 22 biasing the spool 22 to the left as viewed in FIG. 3. The valve bore 21 comprises ports 21a, 21b, 21c, 21d, and 21e. The spool 22 has lands 22a and 22b having the same diameter. The spool 22 has a pressure acting area 22c formed on the lefthand end thereof. The port 21a communicates with the fluid conduit 24 connected with a servo release chamber S/R. The port 21b communicates with the fluid conduit 29 connected with the servo apply chamber S/A. The port 21c communicates via a fluid conduit 25 with the port 26a of the lock-up valve 17. The port 21e is a drain port.

The lock-up valve 17 comprises a spool 27 axially slidable in a valve bore 26, and a spring 28 biasing the spool 27 to the left as viewed in FIG. 3. The valve bore 26 has ports 26a, 26b, 26c, 26d, 26e, and 26f. The spool 27 has lands 27a, 27b, and 27c. The lands 27b and 27c have the same diameter, but the land 27a has a smaller diameter than that of the former two. The spool 27 has a pressure acting area 27d formed on the lefthand end thereof as viewed in FIG. 3. The port 26a communicates with the port 21c of the lock-up timing valve 18. The port 26c communicates with a fluid conduit 30 through which pressurized fluid is supplied to the torque converter T/C from the regulator valve 1. The port 26d communicates via a fluid conduit 31 with a lock-up clutch fluid chamber LC. The ports 26b, 26e and 26f are drain ports, respectively. The fluid is supplied to the torque converter T/C from the fluid conduit 30 and discharged to a fluid conduit 32. The fluid in the fluid conduit 32 is drained via a pressure maintaining valve 33. The fluid pressure within the torque converter T/C, i.e., a torque converter supply fluid pressure, is determined by the pressure maintaining valve 33. The lock-up fluid chamber LC within the torque converter T/C communicates with the fluid conduit 31.

The operation is described.

In the first speed ratio, since no fluid pressure is supplied to the servo apply chamber S/A and servo release chamber S/R, no fluid pressure exists in the fluid conduit 24 and the fluid conduit 29. Thus, no fluid pressure is supplied to the ports 21a, 21b and 21d of the lock-up timing valve 18, and the spool 22 stays in the position as illustrated by upper half thereof as viewed in FIG. 3 by the action of the spring 23. No fluid pressure, therefore, is supplied to the fluid conduit 25, allowing the spool 27 of the lock-up valve 17 to stay in the position as illustrated by upper half thereof as viewed in FIG. 3 by the action of the spring 28. As a result, the fluid conduit 30 is allowed to communicate with the fluid conduit 31, allowing the torque converter supply pressure to be supplied to the lock-up clutch fluid chamber LC. Therefore, the fluid pressure in the lock-up fluid chamber LC becomes equal to the pressure within the torque converter T/C, thus disengaging the lock-up clutch L.

As the vehicle speed increases high enough to put the transmission in the second speed ratio, the fluid pressure is supplied to the fluid conduit 29. This fluid pressure is supplied via the ports 21b, 21c of the lock-up timing valve 18, which is in the position as illsurated by the upper half thereof as viewed in FIG. 3, and the fluid conduit 25 to the port 26a of the lock-up valve 17, urging the spool 27 to move to the position as illustrated by the lower half thereof as viewed in FIG. 3. As a result, the port 26c communicating with the fluid conduit 30 is closed by the land 27b, while the fluid conduit 31 is allowed to communicate with the drain port 26e. The lock-up clutch L is engaged because the fluid in the lock-up clutch fluid chamber LC is discharged via the fluid conduit 31 and port 26d to the drain port 26e.

Figure 4:
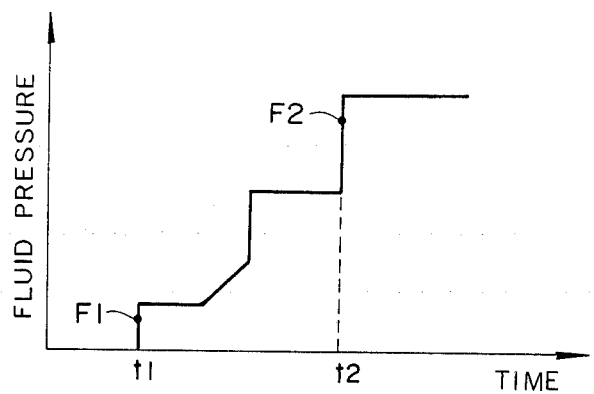
FIG. 4 is a graph how the fluid pressure within the servo release chamber S/A varies during a shifting between two speed ratios.

When, subsequently, the spool of the 2-3 shift valve 4 as illustrated by the left half position thereof as viewed in FIG. 2 switches from the second speed ratio position as illustrated by the right half position thereof as viewed in FIG. 2 to the third speed ratio position as illustrated by the left half thereof as viewed in FIG. 2, the fluid pressure in the servo release chamber S/R starts increasing. The fluid pressure in the servo release chamber S/R increases as shown in FIG. 4. This fluid pressure on the incline is supplied via the fluid conduit 24 to the ports 21a and 21b of the lock-up timing valve 18, acting on the pressure acting area 22c, creating a rightwardly directed, as viewed in FIG. 3, force acting on the spool 22 of the lock-up timing valve 18, tending to move the spool 22 to the right. This rightward movement is resisted by the spring 23. The spring 23 is set such as to allow the spool 22 to switch from one position as illustrated by the upper half thereof to the other position as illustrated by the lower half thereof when the fluid pressure in the fluid conduit 24 increses up to a value denoted by the reference character F1 in FIG. 4. When the spool 22 has switched to the position as illustrated by the lower half thereof as viewed in FIG. 3, the port 21b is closed by the land 22a and the port 21c is allowed to communicate with the port 21d, supplying the same fluid pressure as in the fluid conduit 24, i.e., that in the servo release chamber S/R, to the fluid conduit 25. This fluid pressure acts via the port 26a of the lock-up valve 17 on the pressure acting area 27d. But this fluid pressure is not sufficiently high during the period from t1 to t2 shown in FIG. 4. Therefore, the spool 27 of the lock-up valve 17 is moved back to the position as illustrated by the upper half thereof as viewed in FIG. 3 by the spring 28 at the time when the fluid conduit 25 switches its connection from the port 21b to the port 21d. The spring 28 of the lock-up valve 17 is set such as to allow the spool 27 to switch from the position illustrated by the upper half thereof as viewed is FIG. 3 to the position illustrated by lower half thereof as viewed in FIG. 3 when the fluid pressure supplied to the port 26a increases up to a value denoted by the reference character F2 (see FIG. 4). When the spool 27 has switched to the position as illustrated by the upper half thereof as viewed in FIG. 3, the lock-up clutch L is disengaged. However, when the fluid pressure exceeds the value denoted by the reference character F2, the spool 27 of the lock-up valve 17 is moved to the position as illustrated by the lower half thereof as viewed in FIG. 3 again, engaging the lock-up clutch L. That is, the fluid pressure in the fluid conduit 25 drops only during a period when the fluid pressure in the fluid conduit 24, i.e., that in the servo release chamber S/R increases from F1 to F2. This causes the lock-up valve 17 to switch to the position as illustrated by the upper half thereof as viewed in FIG. 3, thus temporarily releasing the engagement of the lock-up clutch L. As a result, the lock-up clutch L is disengaged during shifting from the second speeed ratio to the third speed ratio, thus avoiding substantial shocks.

The engagement of the lock-up clutch L is temporarily released in a similar manner during shifting from the third speed ratio to the second speed ratio. When the 2-3 shift valve 4 switches from the third speed ratio position to the second speed ratio position, the fluid pressure in the servo release chamber S/R, i.e., the fluid pressure supplied, through the fluid conduit 24, to the ports 21a and 21d of the lock-up timing valve 18, starts decreasing. When this fluid pressure, which is introduced to the fluid conduit 25, decreases slightly, the spool 27 of the lock-up valve 17 switches from the position as illustrated by the lower half thereof as viewed in FIG. 3 to the position as illustrated by the upper half thereof as viewed in FIG. 3. This allows the port 26c to communicate with the port 26d, thus disengaging the lock-up clutch L. However, since the fluid pressure in the servo release chamber S/R decreases rapidly within a short period of time and the fluid pressure in the port 21a also decreases rapidly, the spool 22 of the lock-up timing valve 18 is moved to the position as illustrated by the upper half thereof as viewed in FIG. 3 by the action of the spring 23. This allows the port 21b to communicate with the port 21c, supplying the fluid pressure in the fluid conduit 29, i.e., the fluid pressure in the servo apply chamber S/A, to the fluid conduit 25, acting via the port 26a of the lock-up valve 17 on the pressure acting area 27d, urging the spool 27 to switch to the position as illustrated by the lower half thereof as viewed in FIG. 3, resulting in reengagement of the lock-up clutch L. Therefore, the lock-up clutch L is temporarily disengaged during shifting from the third speed ratio to the second speed ratio, thus avoiding substantial shocks.

FIG. 5 illustrates a second embodiment according to the present invention. With the hydraulic control system shown in FIG. 3, the lock-up clutch L was engaged in all of the forward speed ratios except the first speed ratio. Therefore, the lock-up clutch L may be engaged during operation at low revolution speeds of the engine depending upon the shift pattern selected. This causes the occurrence of vibration during operation at low engine revolution speeds if the transmission is coupled with an engine which produces vibration at low revolution speeds. Therefore, there are occassions where the previous control is not practically acceptable. For avoiding the vibrations during operation at low engine revolution speeds due to the lock-up operation, the hydraulic control system shown in FIG. 5 is provided with a first speed cut valve 41 and a second speed cut valve 42 as fluidly disposed in a fluid conduit 24 and a fluid conduit 29, respectively, for the purpose of avoiding the engagement of the lock-up clutch during operation at low engine revolution speeds. Since a lock-up valve 17 and a lock-up timing valve 18 used in this embodiment are similar to the counterparts in FIG. 3, the same reference numerals are used and description thereof is omitted.

The first speed cut valve 41 comprises a spool 44 axially slidable in a valve bore 43, and a spring 45 biasing the spool 44 to the left as viewed in FIG. 5. The valve bore 43 has five ports 43a to 43e. The ports 43b and 43e are drain ports, respectively. The port 43a is supplied with a governor pressure, which is indicative of a vehicle speed, from a governor pressure conduit 23. The port 43c is connected via a fluid conduit 24' with ports 21a and 21d of the lock-up timing valve 18. The port 43d is connected via a fluid conduit 24 with a servo release chamber S/R. The spool 44 has two lands 44a and 44b having the same diameter. The lands 44a and 44b function to connect the port 43c with the port 43b or with the port 43d depending upon the position of the spool 44. The governor pressure in the port 43a acts on the lefthand end, as viewed in FIG. 5, of the land 44a.

The second speed cut valve 42 is similarly constructed to the first speed cut valve 41. It comprises a spool 48 axially slidable in a valve bore 47, and a spring 49 biasing the spool 48 to the left as viewed in FIG. 5.

The valve bore 47 has five ports 47a to 47e. The ports 47b and 47e are drain ports, respectively. The port 47a is connected with the above mentioned governor pressure fluid conduit 23. The port 47c is connected via a fluid conduit 29' with a port 21b of the lock-up timing valve 18. The port 47d is connected via a fluid conduit 29 with a servo apply chamber S/A. The spool 48 has two lands 48a and 48b of the same diameter. The lands 48a and 48b function to connect the port 47c with the port 47b or the port 47d depending upon the position of the spool 48. The governor pressure in the port 47a acts on the lefthand end of the land 48a as viewed in FIG. 5.

Hereinafter, the operation of this second embodiment is described.

When the vehicle speed is high and accordingly the governor pressure is high, the first and second speed cut valves 41 and 42 assume states as illustrated by lower halves thereof as viewed in FIG. 5 wherein the fluid conduits 24 and 24' communicate with each other and the fluid conduits 29 and 29' communicate with each other. Under this condition, the distribution of the fluid pressure is quite the same as in the first embodiment previously described. Thus, the lock-up valve 17 and the lock-up timing valve 18 operate in the same manner as in the first embodiment. However, when the governor pressure drops low enough to cause the first and second speed cut valves 41 and 42 to assume upper halves thereof as viewed in FIG. 5, the fluid pressures in the fluid conduits 24' and 29' are discharged to the drain ports 43b and 47b, respectively. Thus, the lock-up valve 17 and the lock-up timing valve 18 assume upper halves thereof as viewed in FIG. 5 and the lock-up clutch L is disengaged. The setting of the spring 45 is such that the spool 44 of the first speed cut valve 41 switches from the position as illustrated by lower half thereof as viewed in FIG. 5 to the position as illustrated by the upper half thereof as illustrated by the upper half thereof as viewed in FIG. 5 when the governor pressure in lower than a first predetermined value. The setting of the spring 49 is such that the spool 48 switches from the position as illustrated by the lower half thereof as viewed in FIG. 5 to the position as illustrated by the upper half thereof as viewed in FIG. 5 when the governor pressure is lower than a second predetermined value. Thus, during operation in the third speed ratio, the engagement of the lock-up clutch L is released at a vehicle speed determined by the first speed cut valve 41, and during operation in the second speed ratio, the engagement of the lock-up clutch L is relesed at a vehicle speed determined by the second speed cut valve 42. Preferrably, the second predetermined value is lower than the first predetermined value. Since the provision of the speed cut valves 41 and 42 permits the lock-up clutch to be disengaged before the engine start vibrating, the effecient operation with the lock-up clutch is provided.

FIG. 6 shows a third embodiment according to the present invention.

This embodiment is substantially the same as the first embodiment, but is different from the latter in that a second speed cut valve 42' is disposed between a fluid conduit 25 and a fluid conduit 25' and a first speed cut valve 41' is connected with the second speed cut valve 42'. When the governor pressure in a fluid conduit 23 is high and the second speed cut valve 42' assumes the position as illustrated by the lower half thereof as viewed in FIG. 6, this embodiment provides substantially the same effect as provided by the first embodiment. When the governor pressure decreases and the second speed cut valve 42' assumes the position as illustrated by upper half thereof, a communication between the fluid conduits 25' and 25 is cut off and the fluid conduit 25 is discharged, allowing the lock-up valve 17 to assume the position as illustrated by the upper half thereof as viewed in FIG. 6, thus releasing the engagement of the lock-up clutch L. If the second speed cut valve 42' only were provided, the lock-up clutch L would be released at the same governor pressure value not only in the second speed ratio but in the third speed ratio. However, in this embodiment, the first speed cut valve 41' is provided so that the timing of the release of the lock-up clutch L in the third speed ratio can be set independently. That is, even if the second speed cut valve 42' assumes the position as illustrated by the upper half thereof as viewed in FIG. 6, the fluid conduit 24 wherein the same fluid pressure as in the servo release chamber S/R develops communicates with the fluid conduit 25, thus maintaining the engagement of the lock-up clutch L. Therefore, the lock-up vehicle speed for the third speed ratio is determined by the first speed cut valve 41'. As described above, this embodiment provides substantially the same effect as in the embodiment shown in FIG. 5.

In the above described embodiments, the fluid pressure in the servo apply chamber S/A and that in the servo release chamber S/R which contribute to the shifting between the second speed ratio and the third speed ratio in the three speed automatic transmission. But the present invention may be applied to any automatic transmission as long as the following two kinds of fluid pressure are used. The first fluid pressure is a fluid pressure which is present during operation in the m th speed ratio (where: m is an integer) and the m+1 th speed ratio and the second fluid pressure is a fluid pressure which is present during operation in either one of the m th speed ratio and the m+1 th speed ratio and which is absent in the other speed ratio. The first fluid pressure is supplied to the port 21b of the lock-up timing valve 18, while the second fluid pressure is supplied to the ports 21a and 21d of the lock-up timing valve 18. Apparently, this connection will allow the temporal release of the engagement of the lock-up clutch L during shifting from the m th speed ratio to the m+1 th speed ratio and from the m+1 th speed ratio to the m th speed ratio because the fluid pressure in the fluid conduit 25 drops for a short period of time during the shifting.

Hereinafter, a brief description is made how the first speed cut valve 41' is operatively connected with the second speed cut valve 42'.

Referring to FIG. 6, the first speed cut valve has a bore 43' formed with five ports 43a', 43b', 43c', 43d' and 43e'. The port 43a' communicates with a governor fluid conduit to receive a governor pressure indicative of the vehicle speed. The port 43d' communicates via a fluid conduit 24 with a release chamber S/R (see FIG. 2). The ports 43b' and 43e' are drain ports, respectively. A spool 44 is movable within the bore 43' between a first position as illustrated by upper half thereof as viewed in FIG. 6 and a second position as illustrated by lower half thereof as viewed in FIG. 6. The spool 44' has two lands 44a' and 44b' which has the same diameter. A spring 45' biases the spool 44' toward the first position thereof. In the first position of the spool 44', the port 43c' communicates with the drain port 43b' only, while, in the second position thereof, the port 43' communicates with the port 43d'.

The second speed cut valve 42' has a bore 47' formed with five ports 47a', 47b', 47c', 47d' and 47e'. The port 47a' communicates with the governor pressure fluid conduit 23. The port 47b' communicates with the port 43c' of the first speed cut valve 41'. The port 47c' communicates via the fluid conduit 25 with the lock-up valve 17. The port 47d' communicates via the fluid conduit 25' with the lock-up timing valve 18. The port 47e' is a drain port. A spool 48' is movable within the bore 47' between a first position as illustrated by upper half thereof as viewed in FIG. 6 and a second position as illustrated by lower half thereof as viewed in FIG. 6. The spool 48' has two lands 48a' and 48b' which have the same diameter. A spring 49' is disposed in the bore 47' to bias the spool 48' toward the first position thereof. In the first position of the spool 48', the port 47c communicates with the port 47b' which in turn communicates with the port 43c' of the first speed cut valve 41'. In the second position thereof, the port 47c' communicates with the port 47d' only.

What is claimed is:

1. In a hydraulic control system for an automatic transmission for a vehicle having a torque converter with a lock-up clutch, the automatic transmission having a plurality of forward speed ratios including a m th speed ratio and a m+1 th speed ratio, where: m is an integer, the hydraulic control system having a first portion wherein a first fluid pressure is present during operation in each of the m th speed ratio and the m+1 th speed ratio, and a second portion wherein a second fluid pressure is present during operation in one of the m th speed ratio and m+1 th speed ratio and absent during operation in the other speed ratio, a lock-up valve including a spool movable between a clutch engagement position wherein the lock-up clutch is engaged and a clutch release position wherein the engagement of the clutch is released, and a spring biasing said spool toward the clutch release position, said spool of said lock-up valve having a pressure acting area which is exposed to the first fluid pressure and being urged against said spring toward the clutch engagement position;

means responsive to the second fluid pressure for applying the second fluid pressure to said pressure acting area instead of the first fluid pressure.

2. A hydraulic control system as claimed in claim 1, wherein said applying means includes a lock-up timing valve which is connected with said lock-up valve via a fluid conduit at a port to which said pressure acting area is exposed, said lock-up timing valve comprising a bore having an outlet port connected with said fluid conduit, a first inlet port connected with the first portion to receive the first fluid pressure, a second inlet port connected with the second portion to receive the second fluid pressure, said lock-up timing valve further comprising a spool movable between a first position wherein said outlet port communicates with said first inlet port only and a second position wherein said outlet port communicates with said second inlet port only, and a spring biasing said spool toward the first position, said spool of said lock-up timing valve having a pressure acting area which is exposed to the second fluid pressure and urged against the spring of said lock-up timing valve toward the second position thereof.

3. A hydraulic control system as claimed in claim 2, further comprising:

means for generating a fluid pressure signal indicative of the vehicle speed;

a first speed cut valve for cutting off the application of the first fluid pressure to said pressure acting area of said lock-up valve when said fluid pressure signal is lower than a first predetermined value;

a second speed cut valve means for cutting off the application of the second fluid pressure to said pressure acting area of said lock-up valve when said fluid pressure signal is lower than a second predetermined value.

4. A hydraulic control system as claimed in claim 3, wherein said first predetermined value is lower than said second predetermined value.

5. A hydraulic control system as claimed in claim 2, further comprising:

means for generating a fluid pressure signal indicative of the vehicle speed;

a speed cut valve means fluidly disposed in said fluid conduit for cutting of the application of fluid pressure to said pressure acting area of said lock-up valve in response to said fluid pressure signal when the fluid pressure signal is lower than a predetermined value.

6. A hydraulic control system as claimed in claim 2, further comprising:

means for generating a fluid pressure signal indicative of the vehicle speed;

a first speed cut valve having a bore with an inlet port communicating with the second portion of the hydraulic control system, an inlet port and a drain port, said first speed cut valve includes a spool movable within said bore in response to said fluid pressure signal between a first position wherein said outlet port communicates with said drain port only and a second position wherein said outlet port communicates with said inlet port only, said first speed cut valve including a spring biasing said spool toward the first position thereof;

a second speed cut valve fluidly disposed in said fluid conduit and dividing said fluid conduit into a first fluid conduit portion connecting said lock-up timing valve with said second speed cut valve and a second fluid conduit portion connecting said second speed cut valve with said lock-up valve, said second speed cut valve having a bore with a first inlet port communicating with said first fluid conduit portion, a second inlet port communicating with said outlet port of said first vehicle speed cut valve, and an outlet port communicating with said second fluid conduit portion, said second speed cut valve also including a spool movable within said bore responsive to said fluid pressure signal between a first portion wherein said outlet port thereof communicates with said second inlet port only and a second position wherein said outlet port thereof communicates with said first inlet port only, said second speed cut valve including a spring biasing said spool of said second speed cut valve toward said first position thereof.

* * * * *